(12) United States Patent
Boggs

(10) Patent No.: US 6,443,099 B1
(45) Date of Patent: Sep. 3, 2002

(54) SEPARATOR FOR A FISH DISPLAY TANK

(76) Inventor: George James Elwood Boggs, 366 Apple Dr., Exton, PA (US) 19341

( * ) Notice: Subject to any disclaimer, the term of this patent is extended or adjusted under 35 U.S.C. 154(b) by 0 days.

(21) Appl. No.: 09/969,465

(22) Filed: Oct. 2, 2001

(51) Int. Cl.$^7$ .............................................. A01K 64/00
(52) U.S. Cl. ...................................... 119/248; 119/250
(58) Field of Search ................................ 119/248, 219, 119/250, 251, 246, 253, 255, 256, 417, 422; 230/105

(56) References Cited

U.S. PATENT DOCUMENTS

| | | | | |
|---|---|---|---|---|
| D84,002 S | * | 4/1931 | Smith | 119/250 |
| 1,838,215 A | * | 12/1931 | Clairmont | 119/248 |
| 3,288,110 A | | 11/1966 | Goldman et al. | |
| 3,291,098 A | | 12/1966 | Halpert | |
| 3,304,912 A | | 2/1967 | Hackman et al. | |
| D207,296 S | * | 3/1967 | Bartholomew | D30/105 |
| 3,464,387 A | | 9/1969 | Martinez | |
| 3,584,602 A | | 6/1971 | Stasio | |
| 3,693,591 A | | 9/1972 | Stasio | |
| 3,903,844 A | | 9/1975 | Greenia | |
| 3,921,583 A | * | 11/1975 | De Shores | 119/250 |
| D238,687 S | * | 2/1976 | Braid | D30/105 |
| D243,703 S | * | 3/1977 | Gamble | D30/105 |
| D244,623 S | * | 6/1977 | Braid | D30/101 |
| 4,029,050 A | | 6/1977 | Genest | |
| 4,044,721 A | | 8/1977 | Foley et al. | |
| D249,169 S | * | 8/1978 | Walker | D30/105 |
| 4,120,265 A | | 10/1978 | Davis | |
| 4,147,131 A | * | 4/1979 | Walker | 119/246 |
| D254,874 S | * | 4/1980 | Totten | D11/145 |
| D255,948 S | * | 7/1980 | Robert | D30/105 |
| 4,323,032 A | | 4/1982 | Halfon | |
| D301,775 S | * | 6/1989 | McKeever | D11/145 |
| 4,958,593 A | | 9/1990 | Hurlburt et al. | |
| 5,067,439 A | * | 11/1991 | Hand | 119/249 |
| 5,133,288 A | | 7/1992 | Humphrey | |
| 5,230,298 A | * | 7/1993 | Pearce | 119/250 |
| 5,282,438 A | | 2/1994 | McLaughlin | |
| D350,840 S | * | 9/1994 | Carlisle | D30/101 |
| D353,027 S | * | 11/1994 | Kimrey | D30/101 |
| D379,556 S | * | 5/1997 | Stern | D30/101 |
| 6,019,064 A | * | 2/2000 | Alarcon | 119/247 |

* cited by examiner

Primary Examiner—Yvonne R. Abbott
(74) Attorney, Agent, or Firm—Levis H. Perry, Jr.

(57) ABSTRACT

A substantially transparent separator for separating fish or other aquatic animals within a water-filled display tank. The separator divides the tank into multiple, fully viewable regions in fluid communication with each other. The separator comprises at least one transparent, hollow transit chamber, which has opposing mouth openings cut through its surface. Affixed to each of the mouth openings are rigid, substantially vertical divider plates. Apertures through the divider plates adjoin the mouth openings of the transit chamber(s) to form a protected aquatic passageway through the interior of the tank. The separator thus allows groups of physically separated fish or other aquatic animals to swim above, beneath, and beside each other in a three-dimensional manner. Also, each group of aquatic animals has access to the water surface for feeding. The separator of the present invention is further improved by the addition of guide rails and isolator plates, which permit removal of the separator for cleaning while maintaining separation between the various groups of fish or other animals.

30 Claims, 9 Drawing Sheets

SEPARATOR FOR A FISH DISPLAY TANK

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF THE INVENTION

This invention relates to aquatic animal culturing and display, and particularly to improvements in dividers or separator assemblies used to separate fish within an ornamental fish display tank or aquarium. The breeding and display of live fish within transparent tanks or aquariums is a popular way to add beauty, color, and movement to a home or office. To achieve a varied and interesting aquarium scene, aquarium hobbyists often prefer to display fish of different breeds, sizes and shapes within the same tank. They also typically provide ornaments, obstacles, and decorative backgrounds within the tanks. This variation of fish type and environment adds to the enjoyment of viewers, who are able to see varied types of fish swimming above, below, over and around both each other and the tank ornaments in a rich three-dimensional environment.

A known drawback to displaying fish of various sizes in the same tank is the natural tendency of larger fish to eat smaller fish. This is particularly a problem when newly hatched baby fish, or fry, are contained within the same tank as the mother fish and other larger fish. In such cases, the mother and/or the other larger fish will tend to cannibalize the fry. Also, certain types of fish are known to have aggressive tendencies and will attack other fish, injuring or killing them. For the tropical fish hobbyist, who may have spent large amounts of time and money acquiring and breeding fish, having prized pets devour or maim one another is undesirable. Fish hobbyists have therefore sought ways to keep hostile fish physically separate from other more docile fish while maintaining an interesting live display.

A number of potential solutions to the problem of separating incompatible fish within display tanks have arisen. These approaches include placing screens, panels, and or perforated boxes or cylinders within the tank to divide it into separate compartments. Unfortunately, use of such devices often restrict the movement and of the fish such that they can no longer swim above, below and around each other in a filly three-dimensional manner. Likewise, if opaque structures are used as tank dividers, they limit the permissible angles, areas, and opportunities for viewing the fish, which again detracts from the three-dimensional appearance of the aquatic environment. In addition, if the separator structure creates a completely enclosed compartment with a sealed top, the fish within it will not have access to the water surface, which is important for feeding. Furthermore, these systems often require that the divider elements themselves be mounted to the walls of the fish tank, making initial installation and removal for cleaning difficult. Also, many structures create a substantially watertight seal between the separated compartments, making it necessary to use multiple air pump units for oxygenating the water within each compartment. These shortcomings are addressed by the present invention.

BRIEF SUMMARY OF THE INVENTION

The present invention relates to a transparent separator for use within a fish display tank that separates the tank into multiple, fully viewable compartments, or "aquatic regions," which are in fluid communication with each other. A first group of fish (eg., hostile fish) confined within one of the aquatic regions is able to "visibly," swim through areas that are surrounded by the aquatic region occupied by other (e.g., small or docile) fish, while remaining physically separated from those fish. The separator system disclosed thus allows groups of separated fish to swim above, beneath, beside, and around each other in a fully three-dimensional manner.

In accordance with the present invention, the separator comprises at least one rigid, transparent, hollow transit chamber, which has opposing mouth openings cut through its surface. Securely affixed to each of the mouth openings are rigid, transparent divider plates, which are oriented substantially vertically. Apertures are cut through the divider plates adjacent to and in correspondence with the mouth openings of the attached transit chamber(s). Thus, each transit chamber provides, a passageway through the separator that extends through the aperture of one divider plate, into the intervening transit chamber, and finally out through the opposite aperture of the other divider plate. The divider plates are oriented symmetrically to one another and are rigidly affixed to the transit chamber. The divider plates are sized such that when the separator is placed within a fish tank (with the transit chamber submerged beneath the tank's surface water level, and with the inner volume of the transit chamber filled with water), the divider plates rest stably on the floor of the tank. The top surfaces of the divider plates extend slightly above the surface water level of the tank. The outer dimensions of the separator assembly are smaller than the inner dimensions of the fish display tank so that the separator easily fits within the display tank.

The symmetrically disposed divider plate or plates may be positioned such that less than all sides, excluding the top and bottom sides, of at least one transit chamber are surrounded by the divider plate assembly. In this case, the side edges of the divider plates are either positioned adjacent to the inner surfaces of the fish display tank, or the side edges are positioned adjacent to the side edge region of a neighboring divider plate. Whenever a side edge of a divider plate is positioned adjacent to either an inner surface of the fish display tank or the side edge region of a neighboring divider plate, the spacing between that side edge and the adjacent surface must be such that fish (or any other preferred aquatic animal) larger than a selected size cannot pass through any gap formed at this boundary. Thus, the selected fish are confined to one aquatic region since they cannot pass from an aquatic region whose boundary includes the inner surface of one divider plate to an aquatic region whose boundary includes the outer surface of that same divider plate, or vice versa. The separator therefore effectively divides the fish display tank into plural aquatic regions, each of which have access to the water surface.

In cases where a divider plate's side edges are adjacent a neighboring divider plate, those plates may be integrally connected, in which case, there would be no effective boundary gap. For purposes of the present invention, divider plates, or divider plate/transit chamber assemblies are considered to be "integrally connected" when they are molded from a single piece of material, or are adhesively affixed together, or are connected by permanent solid or perforated edge connectors (the latter being adequate so long as the dimensions of any perforations are sufficiently small that fish larger than a selected size cannot pass through them).

The "selected size" of the confined fish will vary depending on the relative sizes of the fish that are to be segregated. If the segregation of fish is to be completely mutual, such as when one chooses to confine fish of different breeds or appearances or temperaments to different aquatic regions, the selected size of the fish should be such that even the smallest of these fish cannot pass through the boundary gaps.

In one alternative embodiment, symmetrically disposed divider plate or plates are positioned such that all sides, excluding the top and bottom, of at least one transit chamber are completely surrounded by the divider plate assembly. In this configuration, the divider plates may be integrally connected, or the side edges of non-integrally connected divider plates should be positioned sufficiently close to the side edges of adjacent neighboring divider plates that fish larger than a selected size cannot pass through the boundary gaps. Thus, in this configuration, as with the others, fish larger than a selected size cannot pass from the aquatic region whose boundary includes the inner (outer) surface of a divider plate to an aquatic region whose boundary includes the outer (inner) surface of that same divider plate.

In an alternative construction, a separator of the present invention is further improved by the addition of a set of guide rails and isolator plates that permit removal of the separator for cleaning while maintaining separation between the various groups of fish. These components facilitate removal of the separator by permitting the separator to be removed while nevertheless maintaining separation of the various groups of fish. Thus, with these components, the separator may be removed for purposes such as cleaning without requiring removal of any of the fish. In addition, these components promote the stability of the separator without relying on its symmetrical structure.

Many different shapes and configurations of separator components are possible within the scope of the present invention. These and other advantages and features of the present invention will become apparent from consideration of the attached drawings and the detailed description.

BRIEF DESCRIPTION OF THE SEVERAL VIEWS OF THE DRAWINGS

FIG. 9a is a perspective view of another alternative embodiment of the separator assembly.

FIG. 9b is a partial view depicting an alternative feature of the embodiment of FIG. 9a.

DETAILED DESCRIPTION OF THE INVENTION

Figure 1:
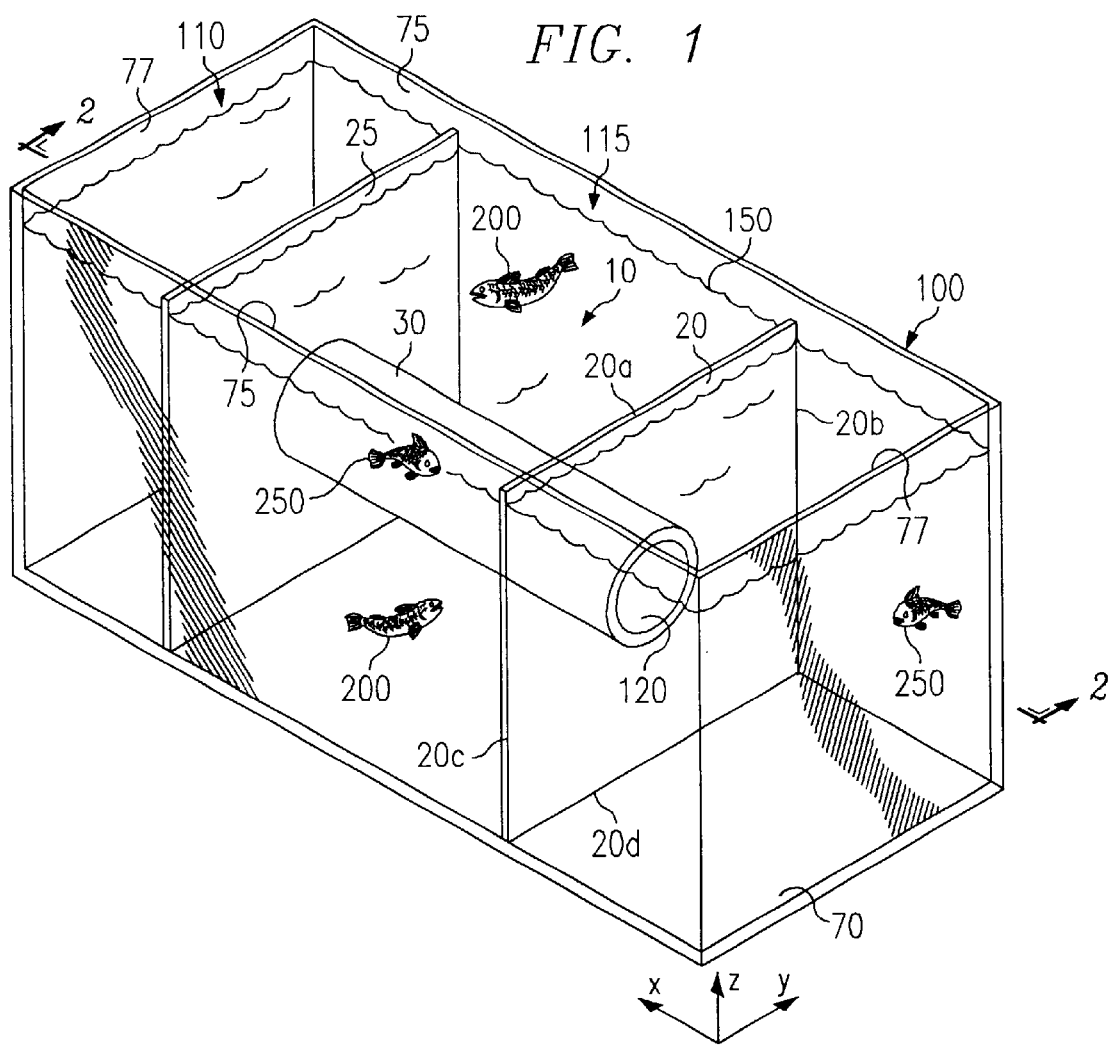
FIG. 1 is a perspective view of a separator in accordance with the present invention.

A separator for a fish display tank in accordance with the present invention is depicted in FIG. 1. In FIG. 1, the separator 10 of the present invention includes divider plates 20 and 25, which are substantially planar and are oriented substantially vertically, (i.e., they rest on a bottom edge as opposed to a planar face). These divider plates are securely and rigidly connected to the mouth openings of a tubular transit chamber 30. The divider plates 20 and 25 have apertures therethrough which are positioned adjacent to and in correspondence with the openings at the ends of transit chamber 30. The separator assembly is contained within fish display tank 100, which has bottom surface 70, front and rear inner surfaces 75, and left and right inner surfaces 77. The display tank 100 is filled with water having a surface water level 150. The divider plates 20 and 25 each have top, bottom, and front and rear side surfaces. With respect to divider plate 20, the top surface is identified as 20a, the bottom surface as 20d, rear side surface as 20b, and front side surface as 20c. The corresponding surfaces of plate 25 are not labeled. The divider plate 20 has a width such that front side surface 20c and rear side surface 20b are adjacent to, though not necessarily in contact with, the inner side surfaces 75 of the fish display tank. The side surfaces of plate 25 are similarly disposed. In addition, the divider plates 20 and 25 are of such a height, and the display tank 100 contains a sufficient volume of water, such that the tops of plates 20 and 25 extend slightly above surface water level 150. Thus, the separator assembly 10 effectively partitions the inner volume of display tank 100 into two aquatic regions, 110 and 115.

Figure 2:
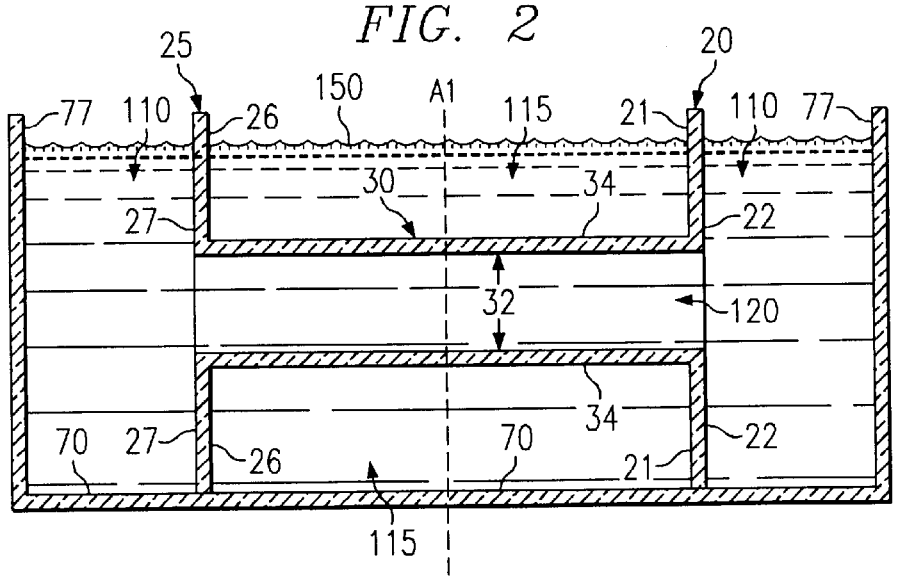
FIG. 2 is a front elevation view of the separator assembly of FIG. 1.

Regions 110 and 115 are more easily seen in FIG. 2, which is an elevation view from the front of the fish display tank. The aquatic region 110 is bounded by the left and right inner surfaces 77 of the fish display tank, the outer surface 27 of divider plate 25, the outer surface 22 of divider plate 20, and the inner surface 32 of the transit chamber 30. The aquatic region 110 therefore also includes the passageway 120, which extends through the interior of the transit chamber 30 and out the corresponding apertures in divider plates 20 and 25. The aquatic region 115 is bounded by the inner surface 26 of divider plate 25, the inner surface 21 of divider plate 20; and the outer surface 34 of transit chamber 30. The aquatic region 115 therefore completely surrounds the outer surface of transit chamber 30, but is separated from the interior of chamber 30. From the line Al in FIG. 2, which bisects transit chamber 30, it can also be seen that divider plates 20 and 25 are symmetrically disposed about the transit chamber with one plate at either end. Since the plates 20 and 25 are also rigidly connected to the mouth openings of transit chamber 30, the separator assembly will rest stably on the bottom surface 70 of fish display tank 100 without the need for attaching the assembly to the walls of the fish display tank. This stability is particularly promoted when passageway 120 within the transit chamber 30 is completely filled with water. Furthermore, it is to be noted that the separator assembly configuration leaves portions of both aquatic region 110 and aquatic region 115 open to the water surface, allowing any fish in these regions to have access to the water surface for feeding.

The transit chamber of the separator assembly 10 should be formed from a generally rigid, transparent material, and preferably the divider plates should be as well. Transparent here means that the material should transmit light sufficiently such that fish within the display tank can still be seen when both a wall of the display tank and a surface of the separator assembly are between the fish and the viewer's line of sight. Such transparent materials include crystal, glass, plastics, acrylics, and other suitable polymers or hard resins.

Figure 3:
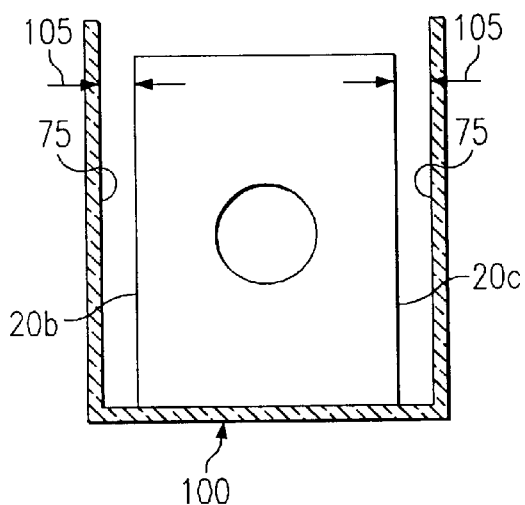
FIG. 3 is a side elevation view of the separator assembly of FIG. 1.

Referring again to FIG. 1, aquatic region 115 of the display tank 100 is populated by fish 200 while fish 250 are located within the aquatic region 110. If for example, it is desired to keep the fish 250 confined within region 110, the gap at the boundary of the side edges of divider plates 20 and 25 and the inner surfaces 75 of fish display tank 100 must be small enough to prevent fish 250 from passing between the divider plate edges and the fish tank walls. The boundary gap 105 between side edges 20b and 20c and display tank is depicted in FIG. 3. The width of this gap may vary depending upon the size of fish 250, and may be reduced to zero, in which case the side edges 20b and 20c would be flush with the tank inner surface 75. Having the edges 20b and 20c flush with the display tank inner surface 75 is not preferred because this configuration restricts the flow of water between the regions 110 and 115, and because the tight spacing makes it more difficult to insert and remove the separator assembly. For most species of fish, a gap of between 0.0625 and 0.25 inches would be sufficient to prevent the fish 250 from passing from the region 110 to the region 115, but for larger fish this gap might be 0.625 inches or more.

When it is desired that the segregation of fish be completely mutual, such as when fish of different breeds or conflicting temperaments are confined to different aquatic regions, the width of the boundary gap should be such that the smallest of either type of fish would be unable to pass through. However, when completely mutual segregation is not particularly desired, the present invention may take advantage of the observed survival instinct of smaller fish to flee from larger fish. For instance, if fish 200 were smaller than fish 250, and mutual segregation of the fish were not required, then fish 200 need not be confined exclusively to region 115, and gap 105 need not be small enough to prevent their passage. So long as gap 105 is small enough to prevent larger fish 250 from entering region 115, region 115 will provide an adequate sanctuary for the smaller fish 200.

In FIG. 1, the central longitudinal axis of the cylindrical transit chamber is oriented substantially in parallel with the left-to-right axis of the fish display tank 100, and orthogonally to the front-to-rear axis. Assuming that viewing is typically from the front of the display tank 100, the left-to-right axis would typically be the long or "main" axis of the display tank (although either the left-to-right or front-to back axes could be considered "longitudinal" axes). Due to the width of the divider plates 20 and 25 in FIG. 1, and because the divider plates and the mouth openings to which they are attached are oriented symmetrically about the main longitudinal axis of the transit chamber, the side edges of divider plates 20 and 25 are adjacent to the inner side surfaces 75 of the fish display tank and meet those inner surfaces at angles that are nearly right angles. Thus, the divider plates 20 and 25 and the front and rear surfaces 75 are substantially perpendicular. This orientation of the divider plates is not required in all embodiments. The divider plates may form any angle with the inner side surfaces of the display tank, so long as the side edges of the divider plates are sufficiently close to the inner side surfaces of the display tank that fish larger than a selected size cannot pass through the boundary gap between the side edges and the display tank inner surfaces. In addition, the divider plates should remain substantially symmetrically disposed about the transit chamber so that the separator assembly 10 rests stably on the bottom of the display tank.

Figure 4:
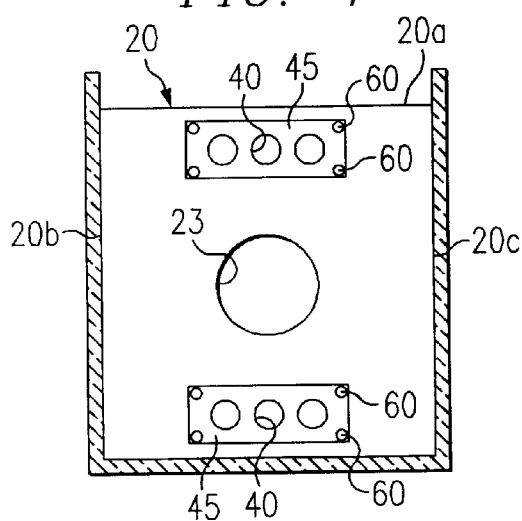
FIG. 4 is a side elevation view of an alternative feature of the embodiment of FIG. 1.

As stated previously, providing a boundary gap 105 promotes the flow of water between the region 110 and the region 115. Thus, if the fish tank 100 is equipped with a water oxygenation/aeration unit, only one such unit need be provided, and it may be positioned to aerate the water within either region 110 or 115. In FIG. 4 an alternative configuration of the divider plate 20 is depicted which further promotes the flow of water between regions 110 and 115. Divider plate 20 and edges 20a and 20b are labeled as previously, and item 23 indicates the main central aperture through divider plate 20. In this embodiment circular apertures 40 through divider plate 20 are added. These apertures are covered by mesh screen 45, which is secured to plate 20 by small screws 60. The mesh screen 45 must be sufficiently fine that at least the large fish cannot pass through it. Preferably mesh screen 45 and screws 60 are formed from non-corrosive materials such as nylon, other plastics, or a non-corrosive metal. Similar apertures with a mesh covering may be added to divider plate 25 in the manner depicted for plate 20.

Figure 5A:
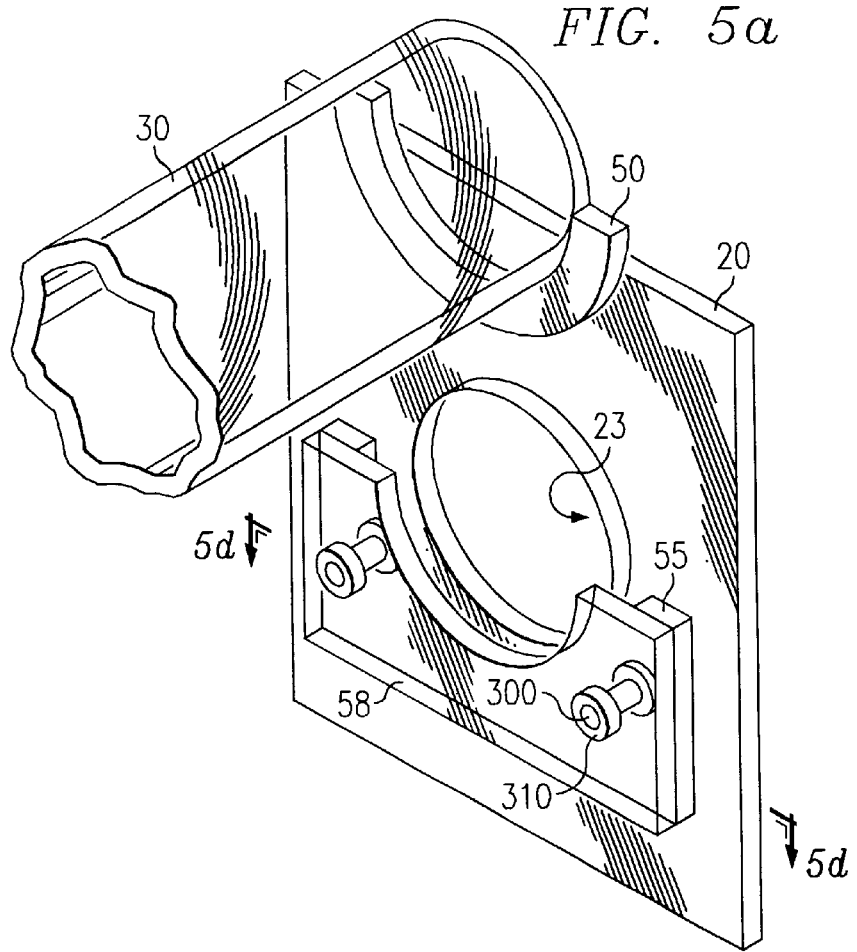
FIG. 5a is a partial view depicting components of a separable joint assembly for use with the present invention, with the components unattached.
Figure 5B:
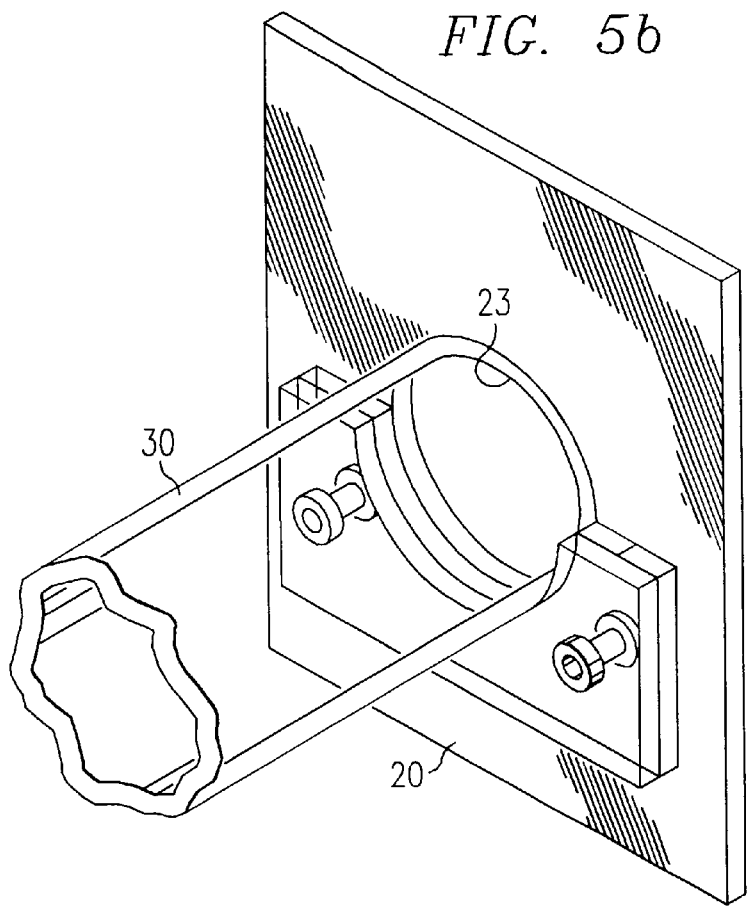
FIG. 5b is a partial view depicting components of a separable joint assembly for use with the present invention, with the components attached.
Figure 5C:
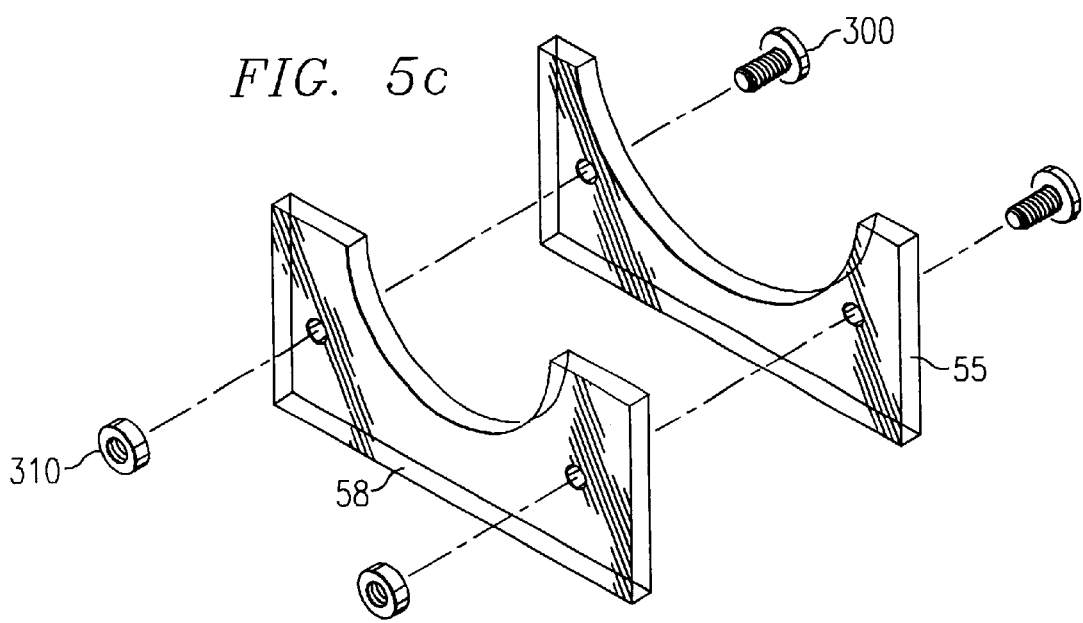
FIG. 5c is a partial exploded view depicting components of the separable joint assembly.
Figure 5D:
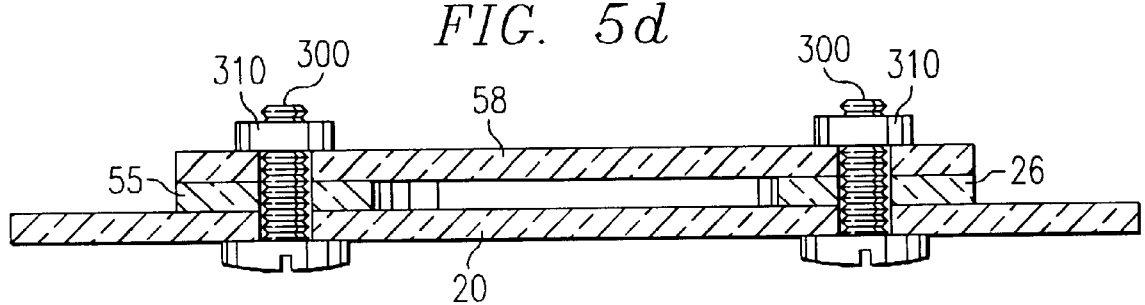
FIG. 5d is a sectional view of FIG. 5a taken along the line B–B'.

For proper stability, the components of the separator assembly (i.e., the divider plates 20 and 25 and the transit chamber 30) should be securely and rigidly affixed to one another. This can be achieved by having these components integrally connected to form a single piece unit. Alternatively, these components may consist of multiple attachable sections. One means of rigidly connecting multiple separator assembly sections is by use of a separable, attachable joint assembly, such as that depicted in FIGS. 5a, 5b, 5c and 5d. In FIG. 5a one end of tubular transit chamber is fitted with a semicircular collar 50, which is firmly connected to the lower periphery of the mouth opening by adhesives or by molding. A corresponding assembly is connected to divider plate 20 and consists of a spacer 55 and an outer housing 58. Both spacer 55 and an outer housing 58 have a semicircular upper portion and a square lower portion (creating a substantially U-shaped appearance) with the semicircular portion of spacer 55 having a larger diameter than the semicircular portion of housing 58. Spacer 55 and housing 58 are adjacent the lower periphery of aperture 23 of divider plate 20 and are connected to plate 20 by means of screws 300 and nuts 310. Spacer 55 and outer housing 58 create a cradle for reception of collar 50, allowing transit chamber 30 and divider plate 20 to fit together as depicted in FIG. 5b. FIG. 5c shows the cradle assembly of FIG. 5a in an exploded view, including spacer 55 and outer housing 58. FIG. 5d shows a cross section of FIG. 5a taken along the line B–B'. In this embodiment a similar type of connection would be used to join the other end transit chamber 30 to divider plate 25. When transit chamber 30 and divider plates 20 and 25 are connected in accordance with the embodiment of FIGS. 5a–d, a rigid connection is established that promotes stability of the separator assembly, but which also allows for easy disassembly for cleaning, or for packing and shipping. Preferably spacer 55 and outer housing 55 should be formed from rigid transparent materials, such as plastic or glass, and screws 300 and nuts 310 should be formed from non-corrosive metal or plastic.

Figure 6:
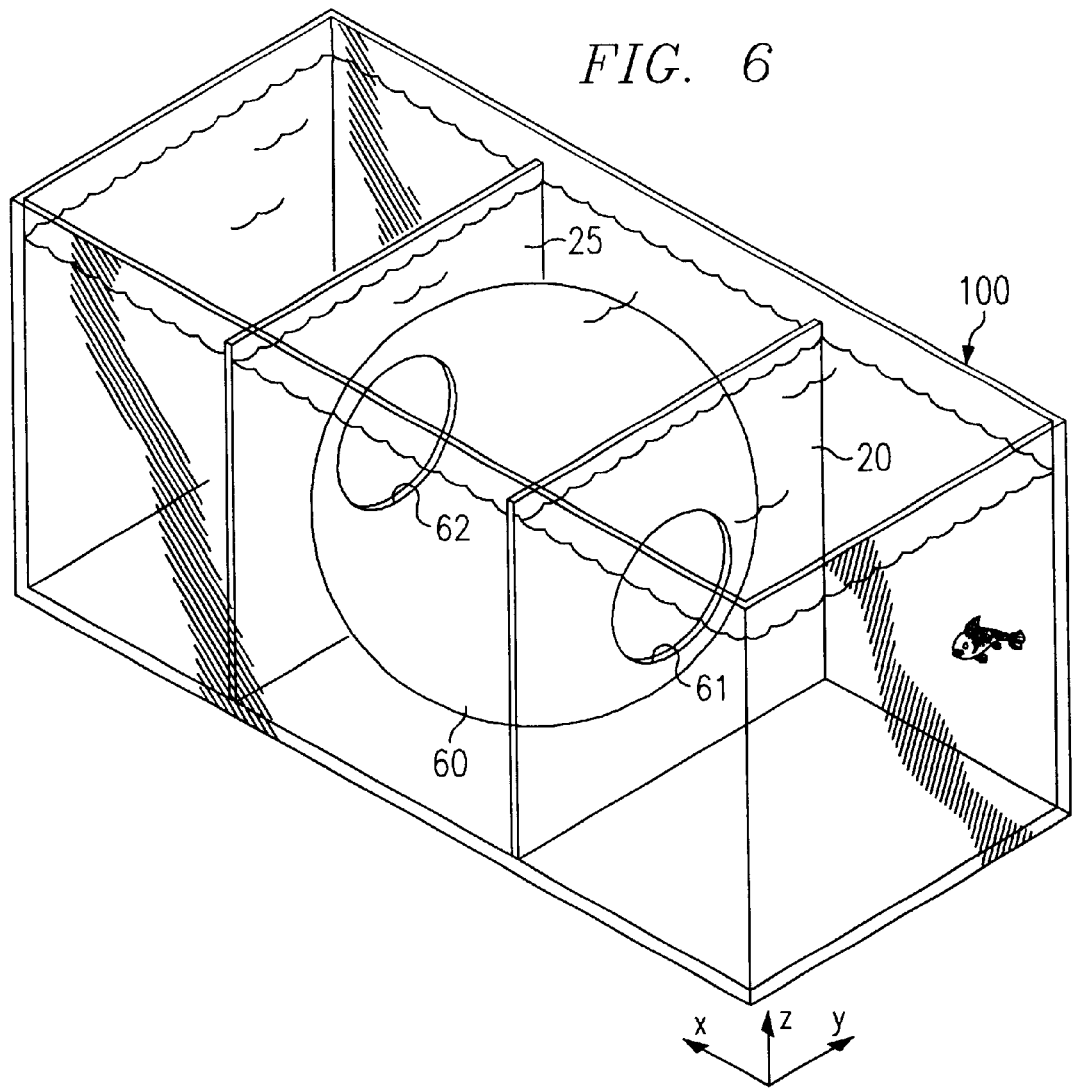
FIG. 6 is a perspective view of an alternative embodiment of the separator assembly.

FIG. 6 presents another embodiment of the present invention. In FIG. 6, fish display tank 100, and divider plates 20 and 25 are labeled as previously; however, the divider plates 20 and 25 are now attached to alternative transit chamber 60. Transit chamber 60 is generally spherical in shape and has openings 61 and 62 at opposing ends which are attached at their peripheries to divider plates 20 and 25 respectively, with the openings 61 and 62 being adjacent to the apertures through the divider plates. The generally spherical shape of transit chamber 60 allows more room for interaction between fish passing through the transit chamber. The divider plates and transit chamber may be attached by a non-water soluble adhesive, or may be molded from a single piece of material, or may be connected using the separable joint assembly depicted in FIGS. 5a–d or its equivalent. Also, the divider plates of this embodiment might also include the addition of mesh-covered apertures as described with respect to items 40 and 45 of FIG. 4.

Because stability of the separator is enhanced when the transit chamber is completely submerged and filled with water, additional measures may be needed to insure complete submersion of spherical transit chamber 60. These measures might include inserting a flexible hose or suction straw into air pockets that might have formed within transit chamber 60 when the separator assembly was placed within the water-filled display tank 100, and using suction to eliminate the air pocket. This measure would ensure that transit chamber 60 is completely filled with water, providing both enhanced stability and a larger area for fish interaction.

Figure 7:
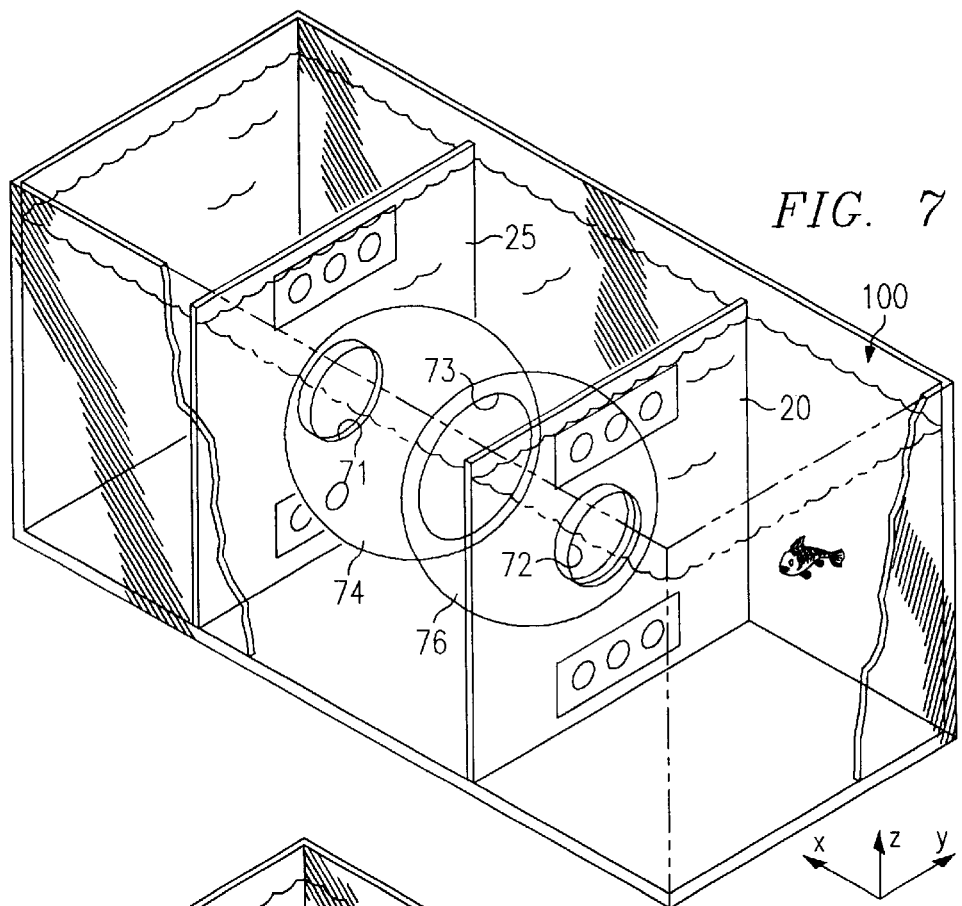
FIG. 7 is a perspective view of another alternative embodiment of the separator assembly.

FIG. 7 provides another variation of the embodiment of FIG. 6. In FIG. 7 divider plates 20 and 25 are labeled as previously. In FIG. 7, a transit chamber is formed from generally spherical sections 74 and 76, each of which have large circular openings cut through their surfaces, and sections 74 and 76 are joined at the perimeter of these openings along a generally circular connection zone 73. The connection between sections 74 and 76 may be provided by forming corresponding male and female screw-type threads at the periphery of the cut-out portions of sections 74 and 76 and joining these threads in the zone 73. Alternatively, the connection may be formed by use of a permanent or detachable joint in the zone 73, or by adhering sections 74 and 76 together in the zone 73 with a non-water soluble adhesive, or by molding sections 74 and 76 from a single piece of material, etc. Sections 74 and 76 each have respective openings 71 and 72 that are attached respectively to divider plates 20 and 25. The attachment of openings 71 and 72 to divider plates 20 and 25 may be by use of any of the previously described means of attaching the transit chamber to the divider plates.

Figure 8:
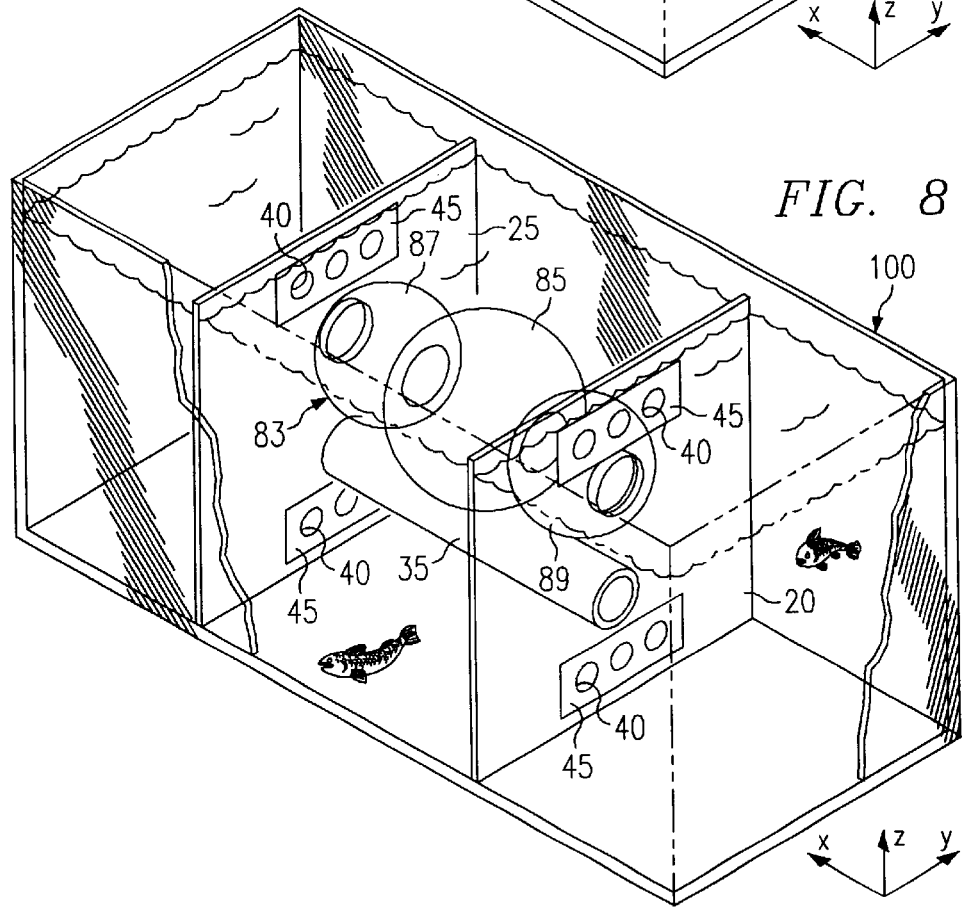
FIG. 8 is a perspective view of another alternative embodiment of the separator assembly.

FIG. 8 depicts a further embodiment of the present invention which combines features of the embodiments of FIGS. 1, 6, 7, and 8. Items identical to those in prior embodiments have the same numerical designations. In FIG. 8, plural transit chambers 35 and 83 are provided which are rigidly connected to divider plates 25 and 20. Transit chamber 35 is similar to transit chamber 30 of FIG. 1. Transit chamber 83 is similar to chamber 76 of FIG. 7, except that transit chamber 83 comprises three substantially spherical sections 85, 87 and 89, which are rigidly connected to each other at the periphery of circular openings cut into their surfaces, and sections 87 and 89 are rigidly connected to divider plates 25 and 20 respectively. The attachment of spherical sections 85, 87 and 89 to each other may be accomplished by any of the attachment means described with respect to sections 74 and 76 of FIG. 7, including forming sections 85, 87, and 89 into an integrally connected unit. In addition, the attachment of sections 85 and 89 to divider plates 20 and 25 may be by use of any of the previously described means of attaching a transit chamber to the separator divider plates. The divider plates 25 and 20 of FIG. 8 also include mesh-covered openings 40 previously described, which are optional.

Figure 9:
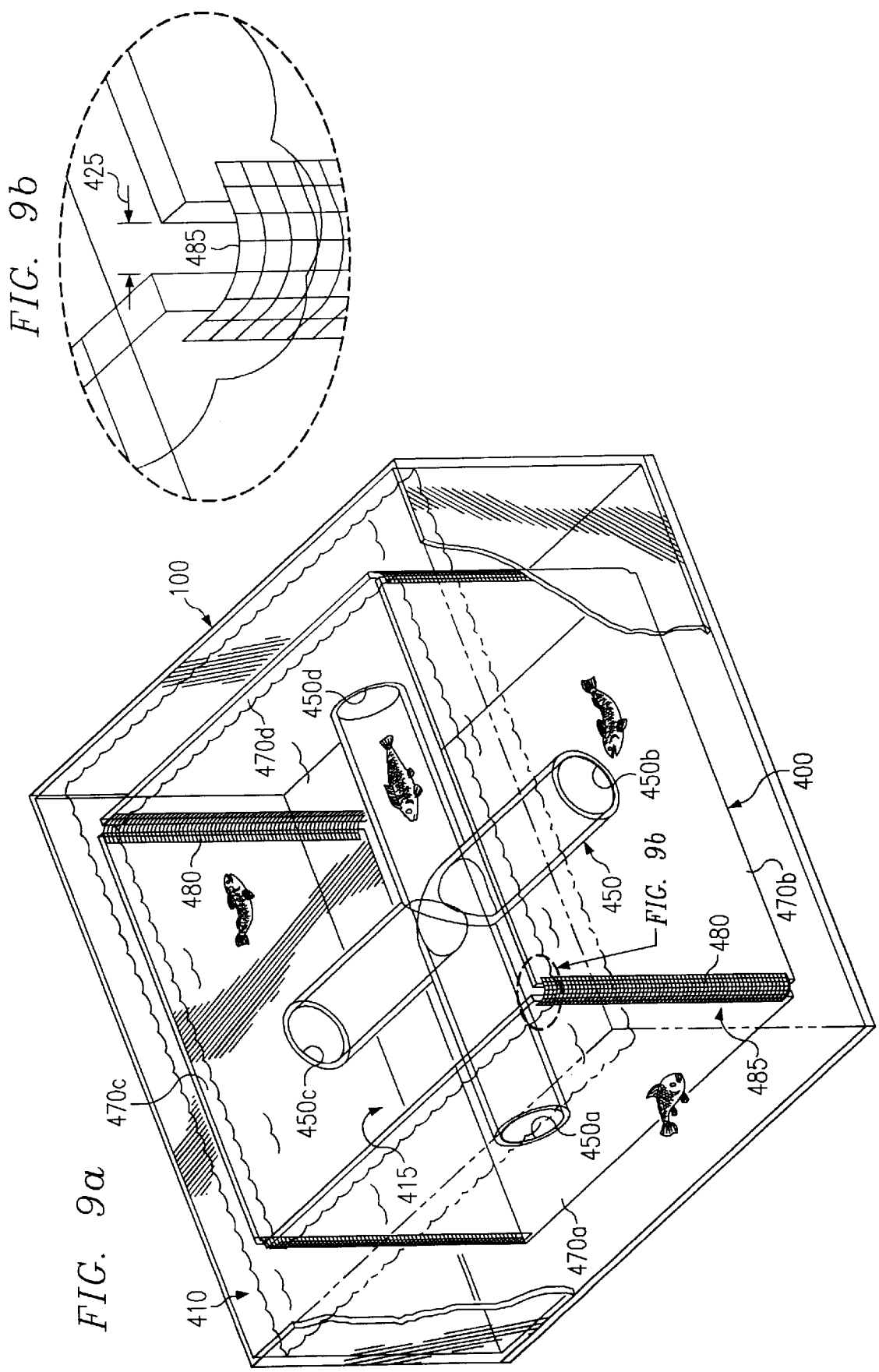

A further embodiment of the present invention is depicted in FIG. 9a. In FIG. 9a, separator assembly 400 comprises hollow, substantially cross-shaped transit chamber 450, consisting of orthogonally disposed and centrally connected cylindrical sections, and having four orthogonally disposed openings 450a, b, c, and d. Openings 450a, b, c, and d are connected at their peripheries to divider plates 470a, b, c, and d respectively. The divider plates 470a, b, c, and d have apertures cut therethrough which are adjacent to and collinear with the openings the 450a, b, c, and d of transit chamber 450 respectively. In the configuration of FIG. 9a, symmetrically disposed divider plates 470a, b, c, and d are positioned such that all sides, excluding the top and bottom, of transit chamber 450 are surrounded by the divider plate assembly. The width of divider plates 470a, b, c, and d is such that adjacent side edges of neighboring divider plates are separated by a boundary gap 425, which is sufficiently small that fish larger than a selected size cannot pass between the adjacent neighboring divider plates. Thus, divider plates 470a, b, c, and d effectively divide fish display tank 100 into aquatic regions 410 and 415, with the boundary of region 410 including the outer surfaces of divider plates 470a, b, c, and d, and the boundary of region 415 including the inner surfaces of divider plates 470a, b, c, and d.

In the embodiment of FIG. 9a, the division of display tank 100 into aquatic regions 410 and 415 now depends solely on the separation between adjacent, neighboring divider plates, and not on the separation between the divider plates and the inner surfaces of the tank 100 itself Thus, there are fewer restrictions on the overall size and shape of the separator assembly 400. So long as the outer dimensions of the separator assembly 400 are such that it will fit within the display tank, and so long as boundary gaps 425 are sufficiently small, divider plates 470a, b, c, and d may take on any desired shape. Indeed, boundary gap 425 may be reduced to zero, in which case divider plates 470a, b, c, and d may be formed into an integrally connected assembly. In such a case, for example, the divider plates might have a rounded cross-section and might even take on the shape of a cylindrical collar. As water flow between regions 410 and 415 is desired, some provision should preferably be made for allowing water passage, such as leaving appropriately sized boundary gaps 425, or even providing a larger gap between adjacent divider plates while covering that gap by a mesh screen, such as mesh screen 480 shown in FIGS. 9a and 9b. In FIG. 9b, mesh screen 480 is stretched across the gap 425 and is adhesively attached to the sides of adjacent divider plates 470a and 470b. If the apertures in the mesh screen 480 are small enough that fish larger than a selected size cannot pass through the mesh, boundary gap 425 need not be restricted in size and may be widened to promote water flow. Additionally, small water flow apertures may be formed through the walls of the divider plate assembly or the walls of the transit chamber, so long as those apertures are sufficiently small that fish larger than a selected size cannot pass through them.

Figure 10:
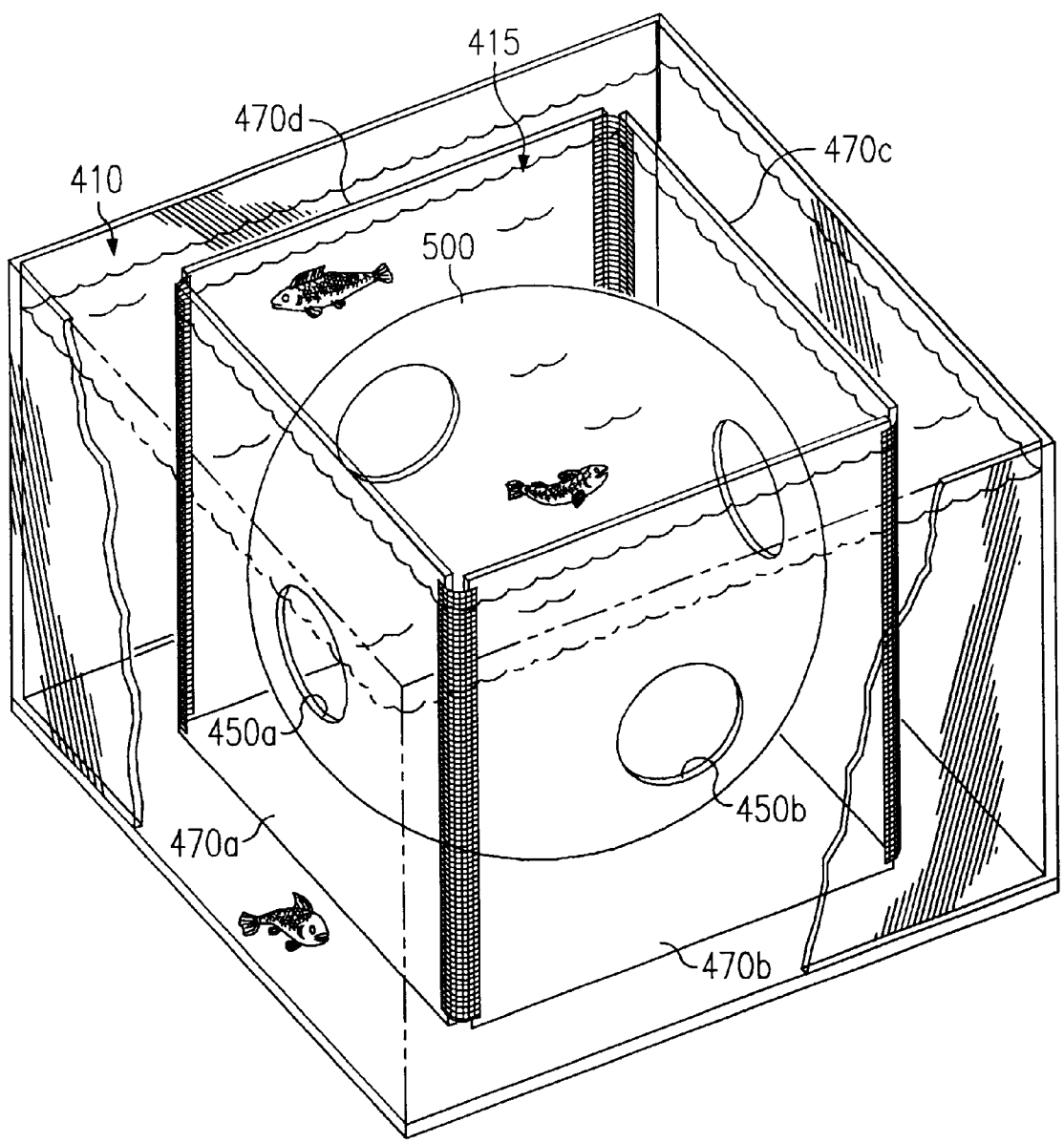
FIG. 10 is a perspective view of another alternative embodiment of the separator assembly.

FIG. 10 depicts a further embodiment that combines certain features of FIGS. 6 and 9a. The items depicted in FIG. 10 are labeled consistently with those of FIG. 9a except that transit chamber 450 is replaced by substantially spherical transit chamber 500. The shape of transit chamber 500 may deviate from spherical to the extent necessary to provide adequate movement space for fish within the aquatic regions 410 and 415.

It should be obvious to one of ordinary skill that numerous variations of size, shape, color, etc., of divider plates and transit chambers may be made without departing from the concept of the separator assembly of the present invention. In addition, various means may be employed for rigidly connecting the components of the separator, such as those described herein, and others. In addition, a separator assembly in accordance with the present invention may be constructed of many different materials; however, the materials used should be sturdy and corrosion resistant. Also, the materials used should be substantially transparent in order to maintain the appearance of an integrated, three-dimensional aquatic environment.

Figure 11:
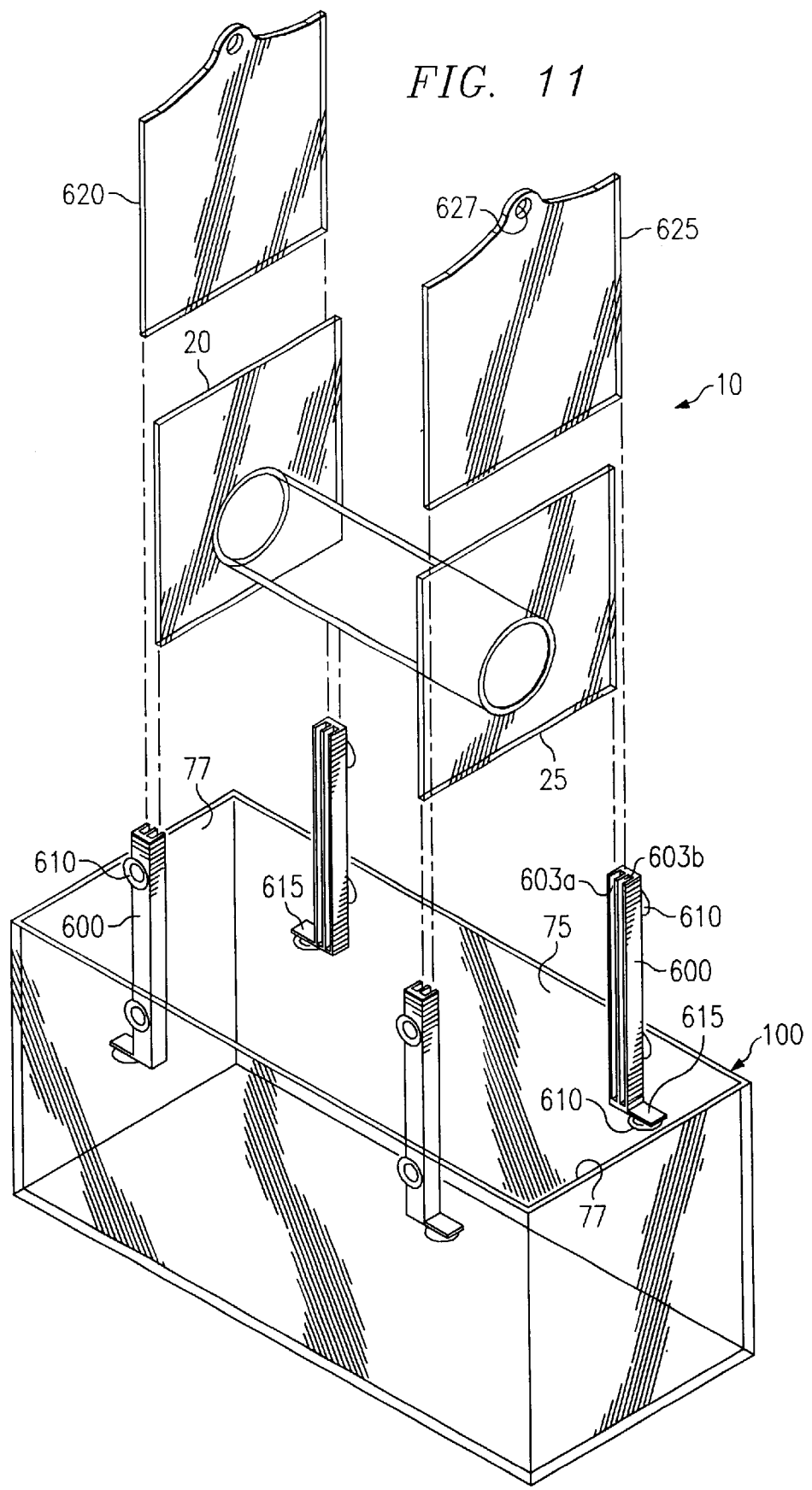
FIG. 11 is an exploded view of the separator assembly of the present invention, which has been further improved by the addition of a set of guide rails and isolator plates.

As a further improvement of the separator assembly described herein, sets of guide rails may be optionally added to facilitate quick and consistent insertion and removal of the separator assembly, such as for cleaning, without unnecessarily disturbing other fixtures or ornaments within the tank. FIG. 11 depicts an exploded view of a separator assembly 10, as described with respect to FIG. 1, which is provided with a set of guide rails 600, with one such guide rail provided for each side edge of divider plates 20 and 25. Guide rails 600 have a generally rectangular cross-section with one open face extending longitudinally down one side of the rail, providing a generally U-shaped channel within the rail.

Each face of guide rail 600 that is opposite the open side of the rail is positioned parallel with and adjacent to an inner side surface 75 of fish display tank 100. Preferably each such face of guide rail 600 is removeably attached to the adjacent inner side surface of the fish tank by a suitable attachment means, such as the suction cups 610 depicted in FIG. 11. Alternatively, the guide rails may be permanently attached to the fish tank walls, such as with a non-water soluble adhesive, or by molding guide rails into the fish tank walls themselves. The U-shaped channels formed in each of the guide rails 600 comprise one or more slots, with the slot closest to the center of fish tank 100 (i.e., the innermost) being adapted for slideably inserting a side edge portion of either divider plate 20 or 25 therethrough lengthwise. In fact, the guide rails 600 depicted in FIG. 11 have two interior slots, an innermost slot, 603a, which is adapted for slideable insertion of a divider plate side edge portion, and an outermost slot, 603b, which is adapted for insertion of an isolator plate 620 or 625. (The function of the isolator plates will be explained later herein.)

Figure 12:
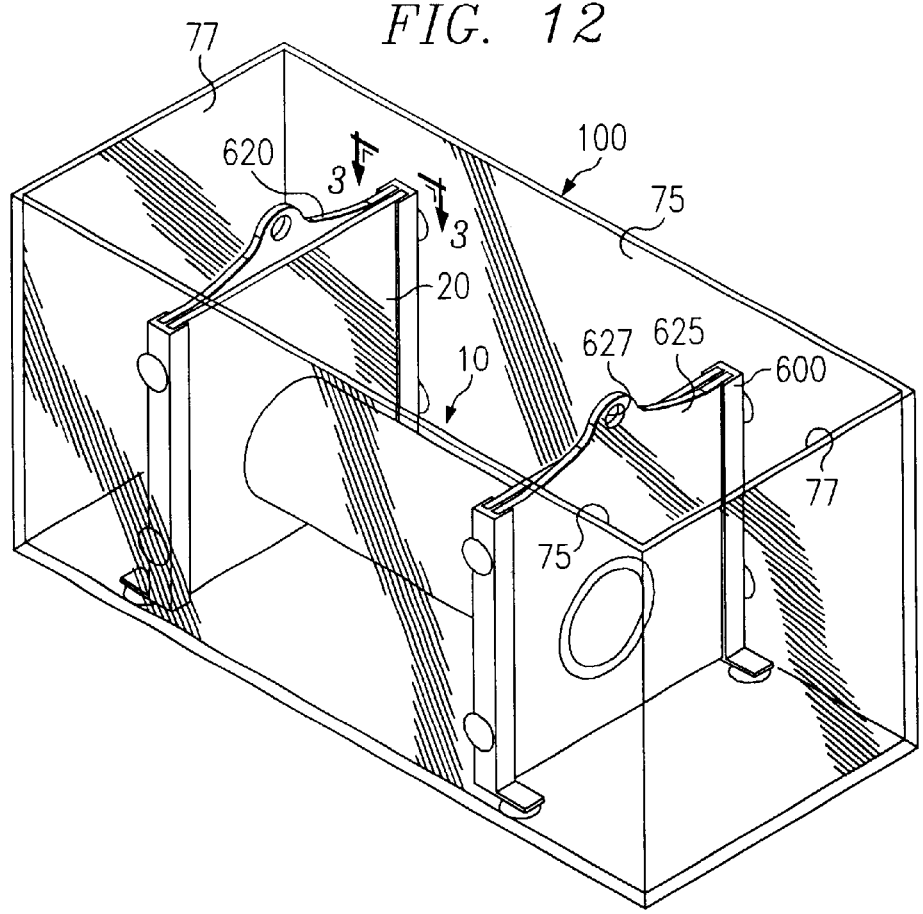
FIG. 12 is a perspective view of the separator assembly of the present invention with the addition of a set of guide rails and isolator plates.
Figure 13:
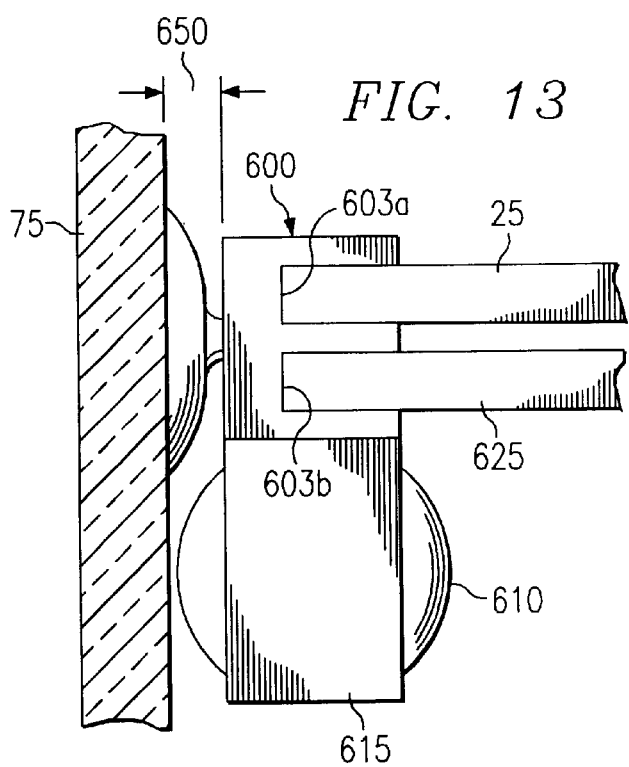
FIG. 13 is a partial top down planar view of a guide rail for use with the separator assembly.

When fully inserted into the guide rails 600, a portion of the divider plates should extend at least slightly above the surface water level of the fish tank 100. The guide rails 600 may also have foot extensions 615 that are rigidly attached to the lower end of the guide rails. Preferably the foot extensions have suction cups 610 attached to their bottom surfaces in order to removeably anchor the guide rails 600 to the bottom surface of fish tank 100. FIG. 12 depicts a separator assembly 10 provided with guide rails 600 as they would appear when placed within a fish tank 100. FIG. 13 provides a top-down view of one of the guide rails 600 of FIG. 12. As shown in FIG. 13, at least one suction cup 610 attaches guide rail 600 to inner surface 75 of the fish tank, while another suction cup 610 beneath foot extension 615 attaches guide rail 600 to the bottom of the tank. Because of the inherent stability stemming from the suction cup attachments of the guide rails, the stability of an associated separator assembly is promoted without relying solely on the symmetrical construction of the separator assembly.

In order to provide proper segregation of fish between the separated regions of a fish tank 100 provided with guide rails 600, the boundary gap 650 between inner side surface 75 of the fish tank and the face of guide rail 600 that is parallel to surface 75 must be sufficiently small that fish larger than a selected size cannot pass through it. Similarly, if the guide rails 600 cause any gap to be created between the bottom edge of either divider plate 20 or 25 and the bottom surface of the fish tank, that gap must also reflect the dimensional constraint described for gap 650. Of course, the bottom of guide rail 600 may be completely open allowing the bottom edges of divider plates 20 and 25 to rest directly on the bottom surface of the fish tank, in which case no appreciable gap would be created.

The isolator plates 620 and 625 allow removal of the separator assembly 10 from the guide rails 600 while providing continued segregation of the fish within the fish tank 100. This facilitates cleaning of the separator assembly 10 by allowing it to be removed from the tank without having to remove any of the fish. Without isolator plates 620 and 625 in place, removal of the separator 10 would allow both groups of fish to have access to each other, with potentially disastrous consequences.

The isolator plates 620 and 625 should be substantially flat and planar and formed from a substantially rigid material, such as glass, plastic, or the like. To maintain the appearance of an integrated, three-dimensional aquatic environment within the fish tank, the materials used for the isolator plates 620 and 625 preferably should be substantially transparent. The thickness of the isolator plates should be such that the plates may be slidably inserted into the outer slots 603b. The height of the isolator plates should be such that when the plates are fully inserted into the guide rails 600, a portion of the isolator plates should extend at least slightly above the surface water level of the fish tank 100. The submerged portion of the isolator plate should be completely impervious to the passage of fish larger than a certain size; so unlike divider plates 20 and 25, there should be no passage aperture through the isolator plates 620 or 625. For example, the submerged portion of the isolator plate 625 may comprise a solid piece of glass or plastic, or a material formed into a fine, but substantially rigid mesh. To facilitate insertion and removal, the isolator plates may be provided with an attached or integrally formed handle, such as top mounted, integrally formed handle 627 depicted in FIGS. 11 and 12. When the isolator plates 620 and 625 are in position in the outer slots 603b of the guide rails 600, separator assembly 10 may be removed from the guide rails 600 while the fish within the tank 100 remain segregated. In particular, fish of a first group would be confined between an outer face of the isolator plates 620 and 625 and the inner surfaces 77 of the fish tank 100, while fish of another group would be confined between the opposing inner surfaces of the plates 620 and 625. If a rigid fine mesh is used for the isolator plates 620 and 625, then fish smaller than a selected size may not necessarily be confined, but would be able to use one or the other of the isolated regions as a sanctuary. When it is once again desired to permit fish of one group to pass through the central area of the fish tank while remaining segregated from fish of the other group, then separator assembly 10 must be in place within the fish tank, and the isolator plates 620 and 625 must be removed (or at least positioned so as not to obstruct the passage apertures through the divider plates 20 and 25).

As with the components of the separator assembly 10, it should be obvious to one of ordinary skill that numerous variations of size, shape, color, material, etc., of guide rails and isolator plates may be made without departing from the concept of the present invention. In addition, various means may be employed for removeably or permanently attaching the guide rails to the interior of the fish tank, such as by use of the suction cups described herein, and by other means.

I claim:

1. A separator for separating aquatic animals within a display tank filled with water, comprising:
    (a) a transit chamber, said transit chamber being formed of a substantially transparent material, and having an outer wall and an interior passageway, and
    (b) plural divider plates formed of a substantially transparent material and securely affixed to said outer wall of said transit chamber,
        (1) said divider plates being positioned symmetrically about the periphery of said transit chamber,
        (2) each divider plate having a passage aperture therethrough aligned with said interior passageway of said transit chamber,
        (3) each divider plate having a bottom edge and a top edge positioned such that when said bottom edge rests on the floor of said display tank said top edge extends slightly above the surface water level of said display tank and said transit chamber is completely submerged, and
        (4) each divider plate having a width with respect to the inner dimensions of said display tank such that when the separator is placed within said display tank with the bottom edges of each divider plate resting on the floor of said display tank, aquatic animals larger than a selected size cannot pass between the divider plates and the inner surfaces of the display tank,
        said separator thereby dividing said display tank into plural aquatic regions which each have access to the water surface.

2. The separator of claim 1 wherein each said divider plate and transit chamber are connected by a separable joint assembly.

3. The separator of claim 1 wherein each said divider plate and said transit chamber are integrally connected.

4. A separator for separating fish within a fish display tank, said fish display tank having a bottom floor, inner side surfaces and a surface water level, comprising:
    (a) at least one transit chamber, said transit chamber being formed of a substantially transparent material, and having an outer wall, a hollow interior, and at least first and second mouth openings through said outer wall, said mouth openings being symmetrically disposed about the inner longitudinal axes of said transit chamber,
    (b) plural divider plates securely and rigidly affixed to said outer wall of said transit chamber at the periphery of each said mouth opening,
        (1) each said divider plate being formed of a substantially transparent material, and having side edges and a bottom edge,
        (2) said divider plates being positioned symmetrically about the periphery of said each said transit chamber,
        (3) each said divider plate having a passage aperture formed through the inner and outer faces of said divider plate adjacent to and corresponding with each respective mouth opening to whose periphery the divider plate is affixed,
        (4) each said divider plate having a height such that when the bottom edge said divider plate rests on the bottom floor of said fish display tank, said divider plate extends slightly above the surface water level of said fish display tank and each said at least one transit chamber is completely submerged beneath the surface water level,
        (5) and each said divider plate having a width such that a boundary gap is formed between each said side edge of each divider plate and the closest adjacent surface to said side edge, said boundary gaps being sufficiently small that fish larger than a selected size cannot pass through said boundary gaps.

5. The separator of claim 4 wherein said closest adjacent surface to each said side edge is an inner side surface of said fish display tank.

6. The separator of claim 5 wherein said at least one transit chamber is substantially cylindrical in shape.

7. The separator of claim 5 wherein said at least one transit chamber is substantially spherical in shape.

8. The separator of claim 5 further comprising at least two transit chambers.

9. The separator of claim 5 wherein said transit chamber further comprises plural substantially spherical sections securely affixed to each other along a substantially circular central connection zone.

10. The separator of claim 5 wherein each said divider plate and said at least one transit chamber are connected by a separable joint assembly.

11. The separator of claim 5 wherein each said divider plate and said at least one transit chamber are integrally connected.

12. The separator of claim 4 wherein said closest adjacent surface to each said side edge is a portion of an adjacent neighboring divider plate.

13. For use within a fish display tank having a surface water level, inner side surfaces, and a bottom floor, a separator comprising:
    (a) at least one transit chamber, said transit chamber being formed of a substantially transparent material, and having an outer wall, a hollow interior, and at least first and second mouth openings through said outer wall, said mouth openings being symmetrically disposed about the inner longitudinal axes of said transit chamber,
    (b) at least one divider plate securely and rigidly affixed to said outer wall of said transit chamber at the periphery of each said mouth opening,
        (1) each said divider plate being formed of a substantially transparent material and having an inner face, an outer face, a top edge, and a bottom edge,
        (2) each said divider plate having a passage aperture formed through the inner and outer faces of said divider plate adjacent to and corresponding with each affixed mouth opening of each said transit chamber,
        (3) each said divider plate having a height such than when said bottom edge of said divider plate rests on the bottom floor of said fish display tank, said top edge of said divider plate extends slightly above the surface water level of said fish display tank,
        (4) and said divider plate or plates being positioned symmetrically about the periphery of said each said transit chamber and having a width such that fish larger than a selected size cannot pass from an aquatic region whose boundary includes an inner face of one of said divider plates to another aquatic region whose boundary includes an outer face of that same one of said divider plates, nor can fish larger than a selected size pass from an aquatic region whose boundary includes an outer face of one of said divider plates to another aquatic region whose boundary includes an inner face of that same one of said divider plates.

14. The separator of claim 13 wherein said at least one divider plate further comprises at least first and second divider plates, with each said divider plate being substantially planar and having first and second side edges, and with each said side edge of each divider plate positioned adjacent to and substantially perpendicular with an inner side surface of said fish display tank, each said side edge being sufficiently close to the respective adjacent display tank inner side surface that fish larger than a selected size cannot pass between said side edge and said inner side surface of said display tank.

15. The separator of claim 14 wherein said at least one transit chamber is substantially cylindrical in shape.

16. The separator of claim 14 wherein said at least one transit chamber is substantially spherical in shape.

17. The separator of claim 14 further comprising at least two transit chambers.

18. The separator of claim 14 wherein said at least one transit chamber further comprises plural substantially spherical sections securely affixed to each other along a substantially circular central connection zone.

19. The separator of claim 14 wherein each said divider plate and said at least one transit chamber are connected by a separable joint assembly.

20. The separator of claim 14 wherein each said divider plate and said at least one transit chamber are integrally connected.

21. The separator of claim 13 wherein said at least one transit chamber comprises
    (a) at least first and second mouth openings at opposing ends of said transit chamber and at least third and fourth mouth openings disposed orthogonally to said first and second mouth openings,
    (b) and the at least one divider plate further comprises
        (1) at least first and second divider plates securely affixed to said outer wall of said at least one transit chamber at the periphery of said first and second mouth openings respectively, with said each of said first and said second divider plates being substantially planar and each having first and second side edges,
        (2) at least third and fourth divider plates securely affixed to said outer wall of said at least one transit chamber at the periphery of said third and fourth mouth openings respectively, with said third and said fourth divider plates being substantially planar and each having first and second side edges,
        (3) and with each said side edge of each said divider plate positioned adjacent to and substantially perpendicular with a side edge of a neighboring adjacent divider plate, each said side edge being sufficiently close to the respective adjacent side edge that fish larger than a selected size cannot pass between said side edges.

22. The separator of claim 21 wherein said at least one transit chamber is substantially spherical in shape.

23. The separator of claim 13 wherein said at least one divider plate and said at least one transit chamber are integrally connected.

24. The separator of claim 13 wherein said at least one divider plate is a single integrally connected assembly.

25. A method of separating aquatic animals within a display tank having a surface water level, inner side surfaces, and an inner floor, comprising the steps of:
    (a) providing a separator assembly within said display tank, said separator assembly comprising:
        (1) at least one transit chamber completely submerged beneath the surface water level of said display tank, said transit chamber being formed of a substantially transparent material, and having an outer wall, a hollow interior, a first inner axis parallel to an inner side surface of said display tank, and at least first and second mouth openings through said outer wall, said mouth openings being symmetrically disposed about said first axis of said transit chamber, and said transit chamber having its interior filled with water,
        (2) at least first and second divider plates affixed to said outer wall of said transit chamber at the periphery of each said mouth opening,
        (3) each said divider having an inner face, an outer face, a top edge, a bottom edge, and first and second side edges,
        (4) each said divider plate having a passage aperture formed through the inner and outer faces of said divider plate adjacent to and corresponding with each affixed mouth opening of each said transit chamber;
        (5) each said divider plate having a height such than when said bottom edge of said divider plate rests on the inner floor of said display tank, said top edge of said divider plate extends slightly above the surface water level of said display tank,
        (6) each said divider plate having a width such that said first and second side edges of each said divider plate are sufficiently close to the inner side surfaces of said display tank such that aquatic animals larger than a selected size cannot pass between said first or said second side edge and the respective adjacent inner side surface of said display tank, thereby forming plural separated aquatic regions within said display tank, and
    (b) placing aquatic animals larger than a selected size within at least one of the aquatic regions.

26. A separator for separating a fish display tank filled with water into plural regions in fluid communication with one another, with each said region having access to the water surface of said display tank, comprising:
    (a) at least one transit chamber, said transit chamber being formed of a substantially rigid, substantially transparent material, and having an outer wall, a hollow interior, and at least first and second mouth openings through said outer wall, said mouth openings being disposed at opposing ends of the main inner longitudinal axis of said transit chamber,
    (b) first and second planar, vertically oriented, divider plates securely and rigidly affixed to said outer wall of said transit chamber at the periphery of each said mouth opening,
        (1) each said divider plate being formed of a substantially rigid, substantially transparent material, and having side edges and a bottom edge,
        (2) each said divider plate having a passage aperture formed through the inner and outer faces of said divider plate adjacent to and corresponding with each affixed mouth opening of each said transit chamber,
(3) each said divider plate having a height such than when said bottom edge of said divider plate rests on the bottom of said fish display tank, said divider plate extends slightly above the surface water level of said fish display tank and each said at least one transit chamber is completely submerged,
(4) and each said divider plate having a width such that a boundary gap is formed between each said side edge of each said divider plate and the closest adjacent surface to said side edge, said boundary gaps being sufficiently small that fish larger than a selected size cannot pass through said boundary gaps.

27. The separator of claim 26 wherein said boundary gaps are between 0.0625 and 0.625 inches wide.

28. The separator of claim 26 wherein said at least one transit chamber further comprises plural substantially spherical sections securely affixed to each other along a substantially circular central connection zone.

29. The separator of claim 26 wherein each said divider plate and said at least one transit chamber are connected by a separable joint assembly.

30. The separator of claim 29 wherein each said divider plate further includes plural mesh-covered apertures formed therethrough, with the perforations of said mesh being sufficiently small that fish larger than a selected size cannot pass through.

* * * * *